Patented Apr. 6, 1948

2,439,213

UNITED STATES PATENT OFFICE 2,439,213

HEAT-RESISTANT COPOLYMER OF STYRENE AND PARA-CHLORO-ALPHA METHYLSTYRENE

John Paul Kispersky, West Lafayette, Ind., and Raymond B. Seymour, Chattanooga, Tenn., assignors to Monsanto Chemical Company, a corporation of Delaware No Drawing. Application March 20, 1946, Serial No. 655,892

2 Claims. (Cl. 260—74)

The present invention relates to copolymers of styrene and para-chloro-alpha-methylstyrene and to methods of producing the same.

An object of the invention is to provide for the plastics and coating industries new resinous materials of improved mechanical strength and heat-resistance.

At the present time, the factor of heat-stability in plastic materials is assuming increasingly great importance due to the demands made upon plastic materials by such fields as electronics and other applications calling upon stability to heat at temperatures of, say, over 100° C. Since the heat distortion point (A. S. T. M.) of polymeric styrene is in the neighborhood of 75° C. to 76° C., polystyrene, in spite of its excellent electrical properties, cannot be used for the fabrication of units which are exposed to such high temperatures in the course of use.

A great deal of experimentation has been done with the object of improving the heat-stability of polymeric materials derived from styrene, either by introducing substituents into the styrene type compound or by polymerizing the unsubstituted styrene in admixture with such copolymerizable compounds as could be expected to have an effect on the heat distortion point of the finished product. But, insofar as is known, the art has not yet been provided with a polymeric material having the required degree of thermal stability and at the same time being clear and colorless and moldable under conditions which do not lead to the decomposition of the polymeric material.

Now we have found that when styrene is copolymerized with para-chloro-alpha-methylstyrene (the preparation of which is described by Ellingboe and Fuson, J. A. C. S., 55, 2960 at 2965 (1933)) in proportions of, say, from 5% to 60% by weight of the latter with respect to the total weight of the monomeric mixture, there are obtained clear, colorless polymeric materials that have heat distortion points of from 85° C. to 115° C., and corresponding in composition to the mixture of comonomers. Copolymers corresponding in composition to the comonomers are readily molded under ordinary conditions employed by the art to yield clear, colorless products.

The present copolymers may be produced either by mass, emulsion, solution or suspension polymerization methods. The copolymerization may be made to take place either in the absence of a catalyst or in the presence of such oxygen yielding compounds as benzoyl peroxide, di-tertiary butyl peroxide, ammonium persulfate, hydrogen peroxide, etc.

The temperature employed is preferably within the range of from 60° C. to 175° C., although for certain purposes, particularly when a high content of the para-chloro-alpha-methylstyrene is employed, the temperature most advantageously employed is from 90° C. to 140° C. Generally, it is advantageous, when using mass polymerization, to employ a temperature above 90° C., but below 110° C. for the initial part of the polymerization, and then to subject the polymer so formed to a short heat-hardening treatment wherein the temperature is raised to above 110° C. but below 175° C.

The preferred proportions of the comonomers employed for producing our resinous products will consist of from 5% to 60% by weight of the chloro-compound, although somewhat more valuable products are prepared utilizing from 20% to 60% by weight of the para-chloro-alpha-methylstyrene in the monomeric mixture, the balance being styrene. Para-chloro-alpha-methylstyrene does not polymerize alone when subjected to ordinary polymerizing conditions. Hence, when the molar quantity of this monomer in the mixture exceeds appreciably that of the styrene, the product lacks a uniformity due to retention of excess chlorinated compound. Accordingly, the para-chloro-alpha-methylstyrene should not be used in appreciably greater amounts than equimolar proportions with respect to the styrene. Although a mixture consisting of 60% para-chloro-alpha-methylstyrene and 40% of styrene is somewhat above an equalmolar amount, this amount may be used without difficulty.

The heat-stability of the present copolymer varies with the ratio of para-chloro-alpha-methylstyrene employed in the mixture of monomers. When the monomeric mixture contains only 5% by weight of the chlorocompound with respect to the total weight of the mixture, the heat distortion (A. S. T. M.) point of the copolymer is about 85° C. With monomeric mixtures containing 40% by weight of para-chloro-alpha-methylstyrene, based on the total weight of the mixture, the heat distortion point (A. S. T. M.) of the resulting copolymer is 107° C. Up to certain limits, the mechanical strength of the product also increases with increased content of the chlorocompound, as will be hereinafter shown.

Because of the excellent thermal and physical properties of the present interpolymers they are valuable for the production of extruded, cast or molded parts for the following purposes:

Electrical insulation, particularly ignition and lighting fixtures for automotive and aeronautical purposes, also switches, sockets, lamp housings, commutators, telephone parts, such as hand sets and bases, flashlight cases, lampshades, vacuum cleaners, electrical shavers, refrigerator parts, hair dryers, rectifiers, transformers, rheostats, voltage regulators, etc., steering wheels, decorative parts, knobs and handles, radio parts, such as molded cases, plugs, adapters, coil forms, coaxial cable spacers, condensers, panel boards, high frequency lead-ins, antenna loops and bases, radar domes and fibrous insulation therefor, dental and surgical instruments and dentures, printing plates, phonographic records, trays, spinnerets and spinning buckets, travelers, thread guides and shuttles for weaving and spinning, pumps, chemical tank lining material, gaskets, optical instruments and accessories.

For certain purposes the interpolymers may be drawn or extruded into threads or filaments. A fibrous material may be obtained by atomizing solutions of these resins in volatile solvents under conditions whereby the solvent is evaporated and the fiber recovered in dry, fibrous form. Such material serves as an ideal heat and electrical insulator.

The present copolymers, being free of carboxy groups or any radicals which are readily hydrolyzed, are resistant to the action of acids and alkalies. Their clarity, transparency and stability of form is unaffected by immersion in boiling water for long periods of time.

The invention is further illustrated, but not limited, by the following examples:

*Example 1*

A mixture consisting of 60 parts by weight of styrene, 40 parts by weight of chloro-alpha-methylstyrene and 0.2% by weight of di-tertiary butyl peroxide as a catalyst was allowed to stand at a temperature of 90° C. for 3 days, 100° C. for 3 days, 120° C. for 2 days and finally 140° C. for one day. The clear, transparent solid thus obtained was solvent-purified by solution in benzene and precipitation of the solution with alcohol. The fibrous, white polymer thus obtained was compression molded at a pressure of 2,000 p. s. i., a temperature of 170° C. and a molding time of 10 minutes. Test specimens thus obtained were found to have the following properties:

Tensile strength _____ p. s. i__ 7,330
Flexural strength _____ p. s. i__ 15,150
Heat distortion point (A. S. T. M.) __ °C__ 107

A similarly prepared polystyrene test specimen was found to have the following properties:

Tensile strength _____ p. s. i__ 6,000
Flexural strength _____ p. s. i__ 12,000
Heat distortion point (A. S. T. M.) __ °C__ 76

The above values for tensile strengths were determined by employing a model J-2 Scott tester and a test strip of the polymers measuring 0.1" x 0.5" x 1.5". The above values for flexural strength were determined by employing a test strip measuring 0.1" x 0.5" x 2.0" in a model J-2 Scott tester, which tester had been modified by special support having curved edges with a radius of 0.0625" and spaced at a distance of 1.0", the test bar being laid flat on said supports. The heat distortion point was determined by the American Society for Testing Materials Method D-648-41T.

The advantageous properties of the styrene-para-chloro-alpha-methylstyrene copolymer of this example, with respect to both mechanical properties and heat distortion, are apparent. The present copolymer is resistant to acids and alkalies, for example, it is unaffected when refluxed for several hours with high strength acids or alkalies. It is likewise unaffected after having been immersed in boiling water for a period of several days.

*Example 2*

A mixture consisting of 93 parts by weight of styrene and 7 parts by weight of para-chloro-alpha-methylstyrene was subjected to the polymerization conditions employed in Example 1. The alcohol-purified, powdery copolymer, obtained as in Example 1, gave clear, colorless, compression molded test specimens having the following properties:

Tensile strength _____ p. s. i__ 6,930
Flexural strength _____ p. s. i__ 14,000
Heat distortion point (A. S. T. M.) __ °C__ 88

This example shows that whereas the strength and mechanical properties of the copolymer are lowered with decrease of para-chloro-alpha-methylstyrene content, the use of even small amounts of the chloro monomer effects substantial improvement in both properties over that possessed by polystyrene.

*Example 3*

A mixture consisting of 42 parts by weight of styrene and 58 parts by weight of para-chloro-alpha-methylstyrene was subjected to polymerizing conditions described in Example 1. The copolymer thus obtained was solvent-purified and subsequently compression molded to yield a clear, colorless copolymer having a heat-distortion point of 113° C.

The effect of para-chloro-alpha-methylstyrene on the heat-stability of copolymers prepared from it and styrene is unique, since other chloro-containing styrenes and nuclearly dichlorinated isopropenyl benzenes do not exert a comparable effect. The ortho-chloro-alpha-methylstyrene does not copolymerize with styrene under customarily employed polymerizing conditions and the meta-chloro-alpha-methylstyrene yields products which are solids but do not have the high degree of heat-stability displayed by those prepared from styrene and para-chloro-alpha-methylstyrene. This is also true of para-chlorostyrene or 2,5-dichlorostyrene copolymers of styrene. The effect of the para-chloro-alpha-methylstyrene is also unexpected when compared to that of alpha-methylstyrene when employed in copolymerizing reactions with styrene. The alpha-methylstyrene-styrene copolymers, as ordinarily prepared, have thermal properties that are somewhat better than those of polystyrenes, but there is little or no improvement in mechanical properties. The use of diolefins, for example, butadiene, has been found to be definitely detrimental in that the products obtained do not have the degree of heat-stability and mechanical strength of those obtained in the absence of the diolefin. The present copolymers are readily molded either by compression or injection molding processes. Although the heat distortion values and the mechanical strength of the copolymers are considerably higher than those of polystyrene, actually successful molding conditions are no more difficult of attainment than for polystyrene.

A variety of methods may be utilized in applying the principles of our invention and the products produced thereby, the invention being limited only by the appended claims.

What we claim is:
1. A resinous material consisting of the interpolymer of 58% para-chloro-alpha-methylstyrene and 42% styrene.
2. The process which comprises polymerizing by the application of heat a mixture of comonomers, said mixture consisting of 58% by weight of para-chloro-alpha-methylstyrene, the balance of said mixture being styrene.

JOHN PAUL KISPERSKY.
RAYMOND B. SEYMOUR.

REFERENCES CITED

The following references are of record in the file of this patent:

UNITED STATES PATENTS

| Number | Name | Date |
|---|---|---|
| 2,398,736 | Dreisbach | Apr. 16, 1946 |

OTHER REFERENCES

Marvel: J. Am. Chem. Soc., 65 (1943), page 2057.